April 1, 1941.　　　　R. ERICH　　　　2,236,790

INERTIA SWITCH

Filed June 24, 1940

INVENTOR
Reuben Erich
BY
Webster & Webster
ATTORNEYS

Patented Apr. 1, 1941

2,236,790

UNITED STATES PATENT OFFICE 2,236,790

INERTIA SWITCH

Reuben Erich, Avenal, Calif.

Application June 24, 1940, Serial No. 342,011

16 Claims. (Cl. 200—52)

This invention relates in general to an improved inertia switch and in particular the invention is directed to an inertia switch designed for use as the circuit closing medium for an electric signal circuit or the like on a vehicle, and particularly an automobile; the switch being normally open and designed to close upon the occurrence of a predetermined inertia impulse, and thus being admirably suited for use to automatically close the circuit for acceleration, deceleration, or radial acceleration.

One of the objects of the invention is to provide an inertia switch which is not sensitive to road shock or the grade which the automobile may be ascending or descending, and yet due to unique application of the principle of capillary depression, is quite sensitive to a predetermined inertia impulse such as that caused by acceleration, deceleration or radial acceleration of the vehicle.

An additional object of the invention is to provide an inertia switch which, when mounted on a vehicle and interposed in the circuit of an electric signal, will give a constant signal as long as the above named vehicle-movement conditions obtain.

A further object of the invention is to provide an inertia switch of the type described which is operative and effective, to produce the desired result, under all normal operating conditions of the vehicle on which the switch may be mounted.

It is also an object of the invention to provide a simple and inexpensive switch whose design lends itself to mass production, and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
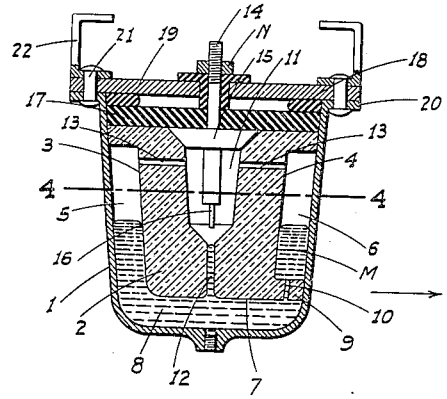
Figure 1 is a sectional elevation of one form of the switch when in normal condition and open.

Referring now more particularly to the characters of reference on the drawing, and at present to the form of the invention shown in Figs. 1-4 inclusive, the numeral 1 indicates a metallic cup initially open at the top and having a slight inward taper from top to bottom.

A core or insert 2, preferably of ceramic material such as porcelain, is disposed in cup 1 and engages therein with a snug fit; such core terminating at its upper end short of the top of the cup. On opposite sides core 2 is formed with elongated, substantially vertical channels 3 and 4 which are initially open to said sides and with the adjacent portions of the cup form chambers 5 and 6 respectively. These chambers are closed at their upper ends. A horizontal channel 7 at the bottom of the core forms a passage 8 which connects between said chambers 5 and 6. The lower end of chamber 6 is formed with an obstruction 9 through which an extremely small diameter bleed orifice 10 extends between said chamber 6 and horizontal passage 8.

The core 2 is provided with a vertical electrode chamber 11 extending on a vertical or inward taper from the core top downward for a substantial distance but terminating at its lower end short of the lower end of said core; the extreme lower end of this electrode chamber tapering inward sharply and forming in effect a conically shaped electrode chamber. A vertical passage 12, of a diameter substantially less than that of chambers 5 and 6, but of considerably greater diameter than orifice 10, connects between the lower end of electrode chamber 11 and horizontal passage 8. The chambers 5 and 6, horizontal passage 8, and vertical passage 12 form—in effect—a mercury holding reservoir of substantially W shape.

Horizontal vents 13 connect between electrode chamber 11 and chambers 5 and 6 adjacent the upper end of the latter.

An electrode 14 extends through a head 15 seated in sealing relation in the upper end of the electrode chamber 11 and depends into said chamber 11; the lower end of said electrode being provided with a depending contact pin 16 of small diameter whose lower end is disposed centrally of and a predetermined distance above the upper end of vertical passage 12.

A dielectric disc 17 is seated on the upper end of the core 2 and is urged downward by a resilient washer 18 compressed between said disc and a top plate 19 fixed on the cup by means of a rim flange 20 on the cup and suitable securing elements such as rivets 21. The electrode extends through disc 17 and top plate 19 in suitably insulated relation to said plate. A nut N is threaded on the upper end of the electrode to secure the same in fixed position.

A quantity of mercury M is disposed in the W shaped reservoirs. The tops of the mercury columns 5 and 6 under static conditions are level. However, under these same conditions, the liquid height of column 12 is somewhat below the level determined by the top of the liquid in chambers 5 and 6 owing to capillary depression. The contact pin 16 is placed some predetermined distance above the liquid column 12.

While the above described switch may be used for numerous purposes on vehicles or other bodies, such as the actuation of safety signals upon occurrence of a predetermined inertia impulse, for the purpose of illustration I will describe its operation as used as a medium to actuate or close the circuit for a deceleration or "stop" signal on a motor vehicle.

Figure 2:
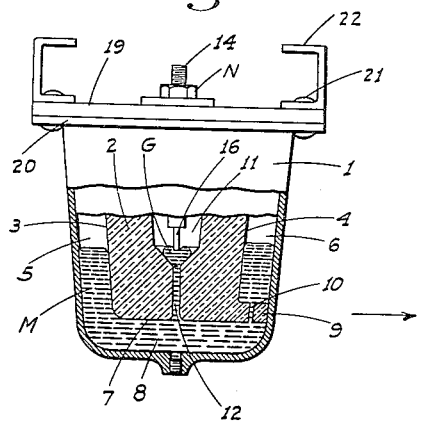
Figure 2 is a side elevation, partly in section, showing the switch as closed.
Figure 3:
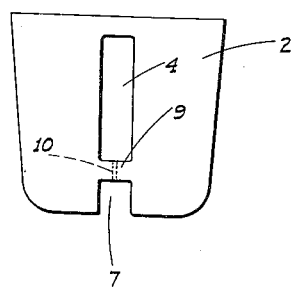
Figure 3 is an end view of the ceramic core.
Figure 4:
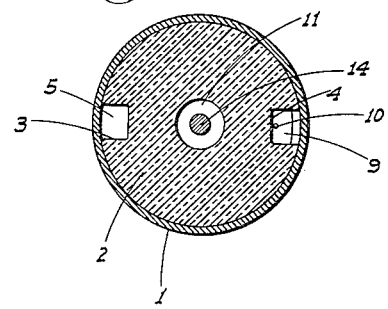
Figure 4 is a cross section on line 4—4 of Fig. 1.

The switch body is oriented in such a way that the chambers 5 and 6 assume a vertical position whose alignment allows displacement of mercury through the orifice 10, as indicated by the arrows adjacent Figs. 1 and 2.

When the vehicle is traveling forward and the brakes are applied, an inertia impulse is created which destroys the static condition in the switch and tends to displace the mercury downward in chamber 5, horizontally forward in passage 8, and upward into chamber 6. However, due to the extreme restriction of orifice 10, leading to chamber 6 from passage 8, the mercury displacement into chamber 6 is retarded, causing the mercury column in vertical passage 12 to rise forming a globule G in the lower end of electrode chamber 11. This globule, upon formation thereof, makes contact with the pin 16, thus closing the switch and signal circuit. With continuance of the deceleration of the vehicle and assuming its constancy, the mercury in passage 8, after a certain period of time and under the influence of the inertia impulse, bleeds through orifice 10 into chamber 6 to an extent that a static condition again occurs within the switch but with the column of mercury in chamber 6 then higher than in chamber 5. When the mercury in the switch reaches this static condition, the globule G deforms and falls back into passage 12 and capillary depression again holds the upper end of said column clear of pin 16. The switch and signal circuit are thus again open. The time required to attain such a static condition, and which controls the length of the signal, is dependent upon the size of orifice 10. It may here be noted that the restriction 10 may be disposed at any point between the lower end of passage 12 and a level in chamber 6 below the normal level of the mercury in passage 12. Also, such restriction to the flow of mercury may be obtained by altering the relative surface friction of the walls of chambers 5 and 6.

Further, due to the fact that passage 12 is relatively restricted and of substantial height, capillary depression of the mercury column in said passage is intensified and unwanted movement or vibration of said column is effectively damped.

As will be obvious, the diameter of orifice 10 and passage 12, the thickness of obstruction 9, and the height of the mercury column in passage 12 and mercury chambers 5 and 6 control the characteristics of the signal as well as the duration thereof.

When the inertia switch is made integral with a vehicle and when the said vehicle is at rest or in uniform motion, the circuit remains open. Then electrode pin 16 becomes neutral to all effect of grade change provided the rate of grade change is made in accordance with the natural leveling up characteristics of the switch.

Figure 5:
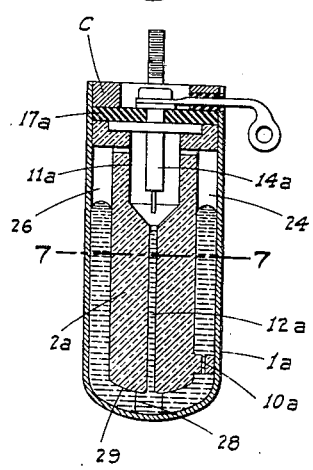
Figure 5 is a sectional elevation of another embodiment of the invention.
Figure 6:
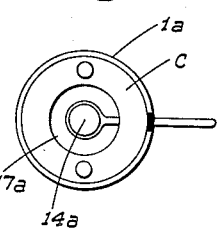
Figure 6 is a top plan view of the same.
Figure 7:
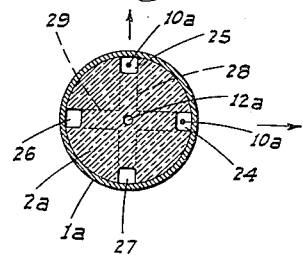
Figure 7 is a cross section on line 7—7 of Fig. 5.

In the embodiment of the invention as shown in Figs. 5-7 inclusive, the switch comprises substantially the same assembly as above described and includes a cup 1a, a dielectric core 2a, a central electrode chamber 11a, an electrode 14a, a vertical central passage 12a, a dielectric disc 17a, and a metallic ring or collar C.

In the assembly of the above parts as a switch unit, the parts are made rigid with the outside or enclosing switch body 1a by a frictional contact or other suitable means.

However, in this embodiment, the core is channeled vertically to form four vertical mercury chambers 24, 25, 26 and 27, respectively, spaced apart 90° or any other angle from each other and interconnected at the bottom by intersecting horizontal passages 28 and 29; the vertical passage 12a communicating with passages 28 and 29 at the point of intersection thereof. The mercury reservoirs thus formed are of intersecting W shape with a common central passage which is vertical passage 12a.

Chambers 24 and 25, at the lower end thereof, are formed with an extremely small orifice 10a, and vertical passage 12a is of the same relative diameter as in the previously described form of switch. In either case, the electrode pin at its lower end is very small compared with the surface area of the mercury exposed in chamber 11, so as to reduce as much as possible the resistance to upward movement of such mercury.

The form of switch shown in Figs. 5 to 7 inclusive illustrates the dual effect of closing the circuit when subjected to radial or tangential acceleration or both.

In this particular embodiment of the "cell" or switch unit, chamber 25 containing orifice 10a is placed in such directional relationship to the vehicle that liquid will be displaced into electrode chamber 11a by reason of a tangential impulse. When chamber 25 is in the above position, chamber 24 will also be in correct relationship with the vehicle to displace liquid into electrode chamber 11a by reason of radial acceleration directed to the left or right.

The elongated type of switch as shown in Figures 5 to 7 inclusive is illustrative of a means to control sundry impulse or vibrational characteristics of various types of bodies when subjected to inertia impulses.

The inertia switch is thus adaptable to industry, transport or other use, and in general to all objects or bodies subjected to measurable velocity changes which may be indicated by the use of an inertia switch either to actuate a signal or produce any other desired effect.

While I have here shown and described the mercury restriction as comprising a small bleed orifice in the mercury passage, the same result may be obtained, without reducing the actual size of the passage bore, by placing therein a physical restricting medium such as steel wool or spun glass, a sieve, or a screw pressed into the bore.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An inertia switch comprising a body having a vertically disposed, substantially U shaped reservoir including an upstanding passage between the legs thereof, a quantity of mercury in said reservoir, a restriction in one leg of the reservoir, and a mercury contact electrode mounted in connection with the body; said electrode being disposed adjacent but spaced above the normal plane of the upper end of the column of mercury in the central passage of the reservoir.

2. An inertia switch as in claim 1 in which the central passage of said reservoir is of substantially greater diameter than the diameter of said one leg at such restriction.

3. An inertia switch as in claim 1 in which the central passage of said reservoir is of substantially greater diameter than the diameter of said one leg at such restriction; and the legs of said reservoir are of greater diameter than the diameter of said central passage.

4. An inertia switch comprising a body having a vertically disposed, substantially U shaped reservoir including an upstanding passage between the legs thereof, a quantity of mercury in said reservoir, a restriction in one leg of the reservoir adjacent the lower end thereof, and a mercury contact electrode mounted in connection with the body; said electrode being disposed adjacent but spaced above the normal plane of the upper end of the column of mercury in the central passage of the reservoir.

5. An inertia switch comprising a body having a vertically disposed, substantially U shaped reservoir including an upstanding passage between the legs thereof, the central passage of said reservoir being of less diameter than the diameter of its legs, a restriction in one leg of the reservoir adjacent the lower end thereof, the diameter of said leg at such restriction being substantially less than the diameter of said central passage, a quantity of mercury in said reservoir, and a mercury contact electrode mounted in connection with the body; said electrode being disposed adjacent but spaced above the normal plane of the upper end of the column of mercury in the central passage of the reservoir.

6. An inertia switch comprising a body having a vertically disposed, substantially U shaped reservoir including an upstanding passage between the legs thereof, a restriction in one leg of the reservoir, the diameter of said leg at the restriction being substantially less than the diameter of the central passage of the reservoir, the body having an electrode chamber therein above and in communication with the upper end of said central passage, an electrode in said chamber terminating adjacent but spaced from the lower end thereof, and a quantity of mercury in said reservoir; the upper end of the column of mercury in said central passage normally being disposed below said lower end of the electrode chamber.

7. An inertia switch as in claim 6 in which the lower end portion of the electrode chamber tapers sharply downwardly and inwardly to the upper end of said central passage of the reservoir.

8. An inertia switch comprising a body having a vertically disposed, substantially U shaped reservoir including an upstanding passage between the legs thereof, a quantity of mercury in said reservoir, a restriction in one leg of the reservoir, the body having an electrode chamber therein above but in communication with the central passage of the reservoir, and having vents between said chamber and the upper end portions of the legs of the reservoir; a mercury contact electrode in said chamber and terminating adjacent but spaced from the lower end of said chamber, the upper end of the mercury column supported by said central passage normally being clear of said electrode.

9. An inertia switch comprising a body having a reservoir therein which includes three upstanding passages and an intercommunicating passage connecting said upstanding passages some distance below their upper ends, a quantity of conductive fluid in the reservoir, one of said passages having a restriction therein above the plane of said intercommunicating passage, and a fluid contact electrode mounted in connection with the body and disposed adjacent but spaced above the normal plane of the fluid column in another of said passages; the diameter of said other passage being substantially greater than the diameter of said one passage at said restriction.

10. An inertia switch as in claim 9 in which the column of mercury in each of the upstanding passages is of substantially greater length than said intercommunicating passage.

11. An inertia switch comprising a body having a pair of vertically disposed substantially U shaped reservoirs disposed in intersecting relation intermediate their ends, and a vertical passage in communication with and upstanding from said reservoirs at the point of intersection thereof; a quantity of mercury in said reservoirs and said vertical passage, a restriction in one leg of each reservoir, and a mercury contact electrode mounted in connection with the body, said electrode being disposed adjacent but spaced above the normal plane of the upper end of the column of mercury in said vertical passage.

12. An inertia switch as in claim 11 in which said substantially U shaped reservoirs intersect at right angles to each other.

13. An inertia switch as in claim 11 in which said vertical passage is of relatively small diameter as compared to the legs of the reservoirs, but of relatively great diameter as compared to the diameter of the restricted portion of said one leg of each reservoir.

14. In an inertia switch, a cup initially open at its upper end, a dielectric core seated in said cup, means securing the core in the cup, the core being channeled to form with the cup a vertically disposed, substantially U shaped reservoir, the core having a vertical passage therein communicating at its lower end with the reservoir intermediate its legs, means forming a restriction in one leg of the reservoir adjacent its lower end, a quantity of mercury in said reservoir and passage, and a mercury contact electrode mounted in connection with the core; said electrode being disposed adjacent but spaced above the normal plane of the upper end of the column of mercury in said passage.

15. An inertia switch as in claim 14 in which the cup and core taper inwardly from top to bottom; said securing means comprising a dielectric disc seated on top of the core, a top plate mounted on the cup, and a resilient member compressed between the top plate and disc.

16. An inertia switch comprising a body having a vertically disposed, substantially U shaped reservoir including an upstanding passage between the legs thereof, a quantity of mercury in said reservoir, a mercury contact electrode mounted in connection with the body and disposed above the normal plane of the upper end of the column of mercury in the central passage, and means to retard the lengthwise flow of mercury lengthwise in one leg of the reservoir.

REUBEN ERICH.